Sept. 24, 1940. L. A. HAYES ET AL 2,215,927
SELF-CENTERING CHUCK
Filed Oct. 8, 1938 3 Sheets-Sheet 2
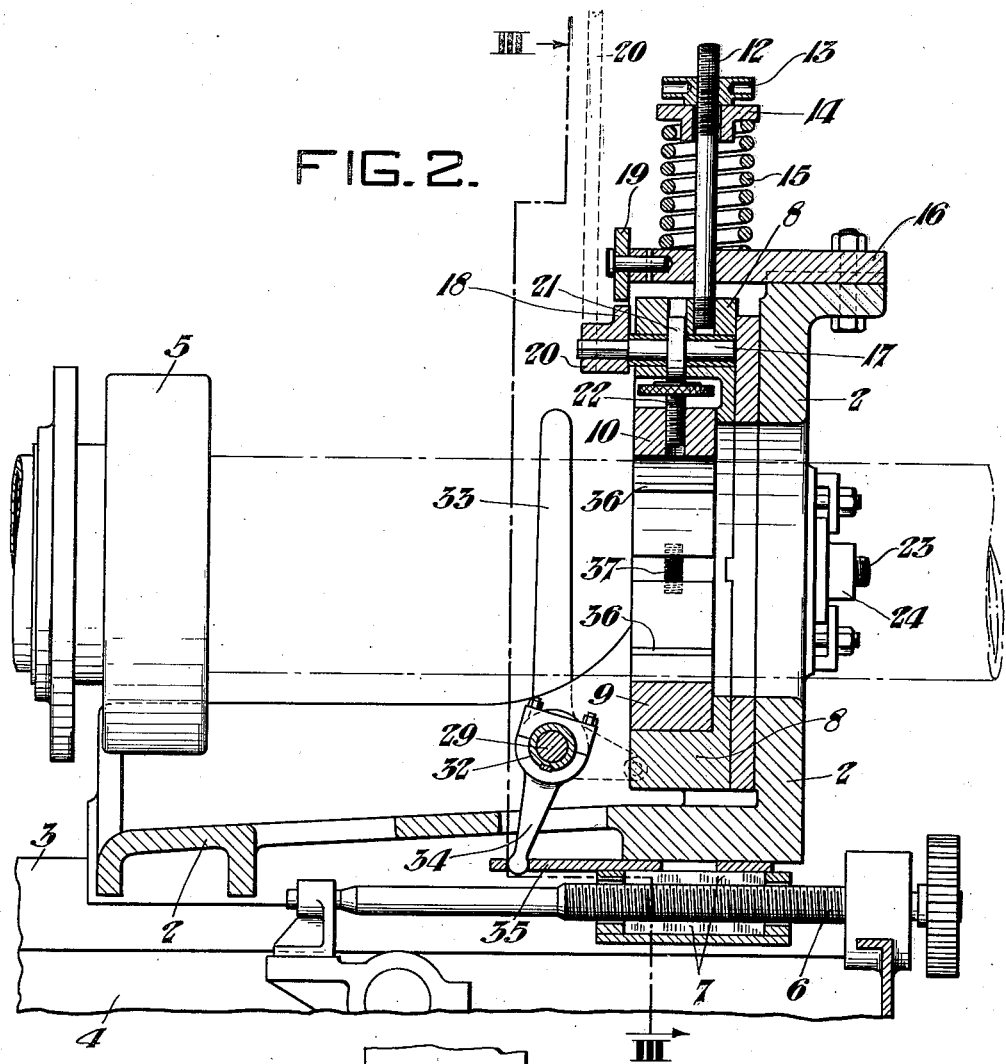
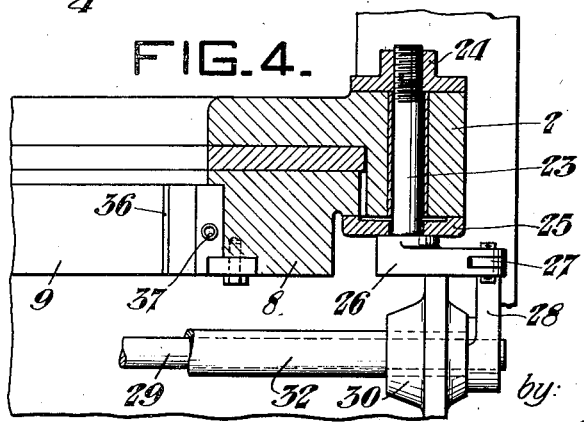
Inventors:
LOREN A. HAYES and
WALTER T. MAHLA.
by John E Jackson
their Attorney.

Sept. 24, 1940. L. A. HAYES ET AL 2,215,927
SELF-CENTERING CHUCK
Filed Oct. 8, 1938 3 Sheets-Sheet 3

Inventors:
LOREN A. HAYES and
WALTER T. MAHLA.
by: John E Jackson
their Attorney.

Patented Sept. 24, 1940

2,215,927

UNITED STATES PATENT OFFICE 2,215,927

SELF-CENTERING CHUCK

Loren A. Hayes, Elyria, and Walter T. Mahla, Lorain, Ohio, assignors to National Tube Company, a corporation of New Jersey Application October 8, 1938, Serial No. 234,018

9 Claims. (Cl. 10—107)

This invention relates to a self-centering chuck and, particularly, to such a chuck of an improved type for use in connection with threading or other machining operations on pipe and the like.

In performance of various machining operations on tubular objects, and especially in the cutting of threads on pipe, it is desirable to provide a chuck or device whereby the pipe or tubular object can center itself relative to the cutting dies at the start of the cutting or threading operations. Such a self-centering device is an advantage in that it provides better cutting action by the tool on the material, and extends materially the life of the tool.

It is among the objects of the present invention to provide an improved self-centering chuck or device which is simple and inexpensive in its construction and one which consists of a minimum number of parts.

It is another object of the invention to provide an improved self-centering chuck having parts which are freely floating in one position and securely locked against movement in another position.

It is a further object of the invention to provide an improved self-centering chuck which will quickly and accurately center the work relative to the cutting tool with the least amount of attention and effort by the operator.

Various other objects and advantages of this invention will be more apparent in the course of the following specification and will be particularly pointed out in the appended claims.

In the accompanying drawings, there is shown, for the purpose of illustration, one embodiment which our invention may assume in practice.

In these drawings:

Figure 2 is a vertical longitudinal section taken on the line II—II of Figure 1;

Figure 1:
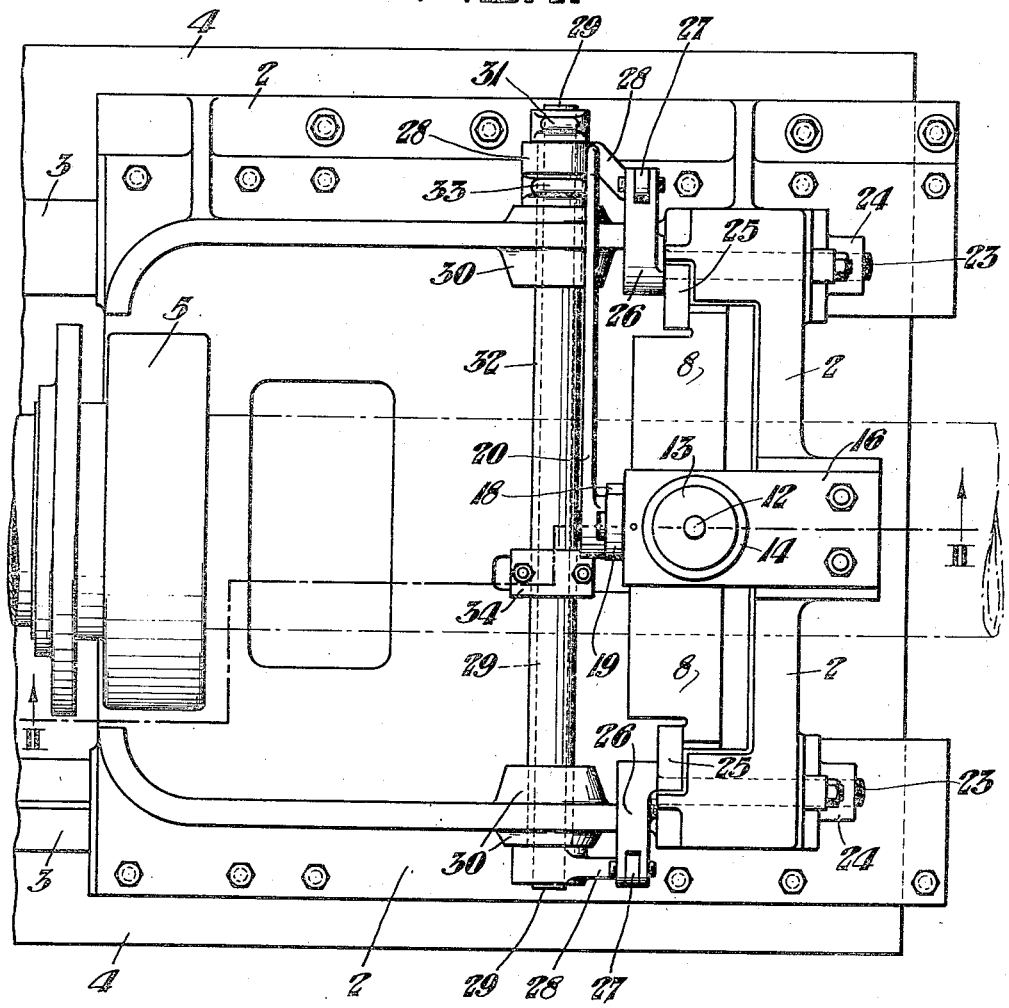
Figure 1 is a plan of the improved self-centering chuck of our invention.

Referring more particularly to the drawings, the improved self-centering chuck or device of our invention comprises a rigid support or frame 2, in the form of a carriage, slidably mounted on guides 3 positioned on the base 4 of a pipe threading machine opposite a rotating head 5 arranged thereon which is provided with threading dies or tool for threading the end of the pipe arranged in a chuck on the carriage 2. In operation, the carriage 2 is advanced towards the rotating head 5 so that the work is centered with respect to the threading dies or tools carried thereby, preferably by means of a longitudinally extending lead screw 6 carried by the base of the machine which cooperates with disengageable half-nuts 7 carried by the underside of the carriage 2.

According to the invention, there is floatingly mounted on the rigid support or carriage 2 a frame 8 having a lower work-engaging jaw or part 9 preferably securely attached thereto and a similar upper work-engaging jaw or part 10 which is slidably arranged therein. The frame 8 is suspended from the end of a stud 12 which is, in turn, supported by means of an adjustable nut 13, an annular member 14 and a compression coil spring 15 arranged preferably above a plate 16 centrally mounted on top of the carriage 2.

There is arranged in the top of the frame 8, preferably just below the stud 12, a stud-shaft 17 on which there is mounted adjacent the outer end thereof a cam 18 positioned just below a roller 19 located on the outer end of the plate 16, and an actuating lever 20. There is also intermediately mounted on the shaft 17 another cam 21 which is adapted to bear against the head of an adjustable screw 22 carried by the upper work-engaging jaw or part 10 of the frame 8.

There is provided along the sides of the frame 8, clamping means for locking the same against movement in the support 2. This clamping means consists of screws 23, one suitably mounted on the carriage or support 2 at each side thereof, having nuts 24 with which they cooperate preferably positioned on the carriage at the back side thereof, and clamping plates 25 positioned on the front side of the carriage. The clamping screws 23 are adapted to move the plates 25 against the carriage 8 to lock the same against movement by means of crank arms 26 integrally connected with the screws 23 at the inner ends thereof and which bear against the plates 25. The outer ends of the crank arms 26 are connected to links 27 which, in turn, are connected to crank arms 28 carried by a shaft 29 at each end thereof arranged in suitable bearings 30, preferably positioned on the front side of the carriage 2. The shaft 29 is rotated by means of an actuating lever 31 preferably positioned on the outer end thereof.

There is also mounted in the bearings 30 and around the shaft 29, an annular shaft 32 having an actuating lever 33 arranged adjacent the outer end thereof and a crank arm 34 mounted thereon preferably intermediate the bearings 30. The outer end of the crank lever 34 is suitably connected to a sliding member 35 which actuates the half-nuts 7 to engage and disengage the lead screw 6 by actuation of the lever 33.

The work-engaging jaws or parts 9 and 10 preferably have inserts 36 arranged therein which are adapted to keep the work from slipping therefrom and preferably have a pair of coil springs 37, one positioned at each side of the center thereof and therebetween for normally spacing apart the chuck jaws 9 and 10 and normally keeping them away from the position they assume in engaging the work.

Figure 3:
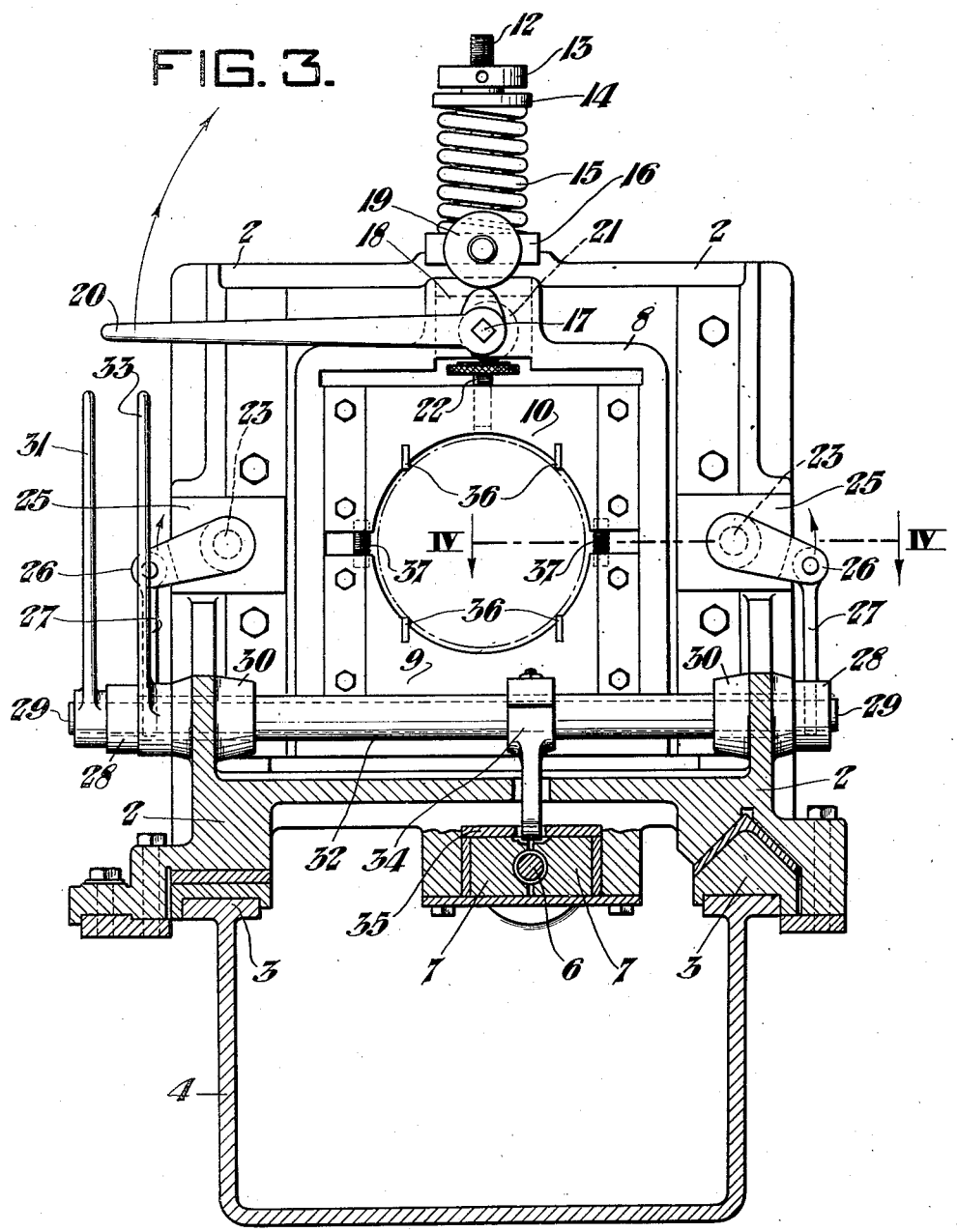
Figure 3 is a vertical transverse section taken on the line III—III of Figure 2; and, Figure 4 is a section taken on the line IV—IV of Figure 3.

It will be understood that when the improved self-centering device of our invention is open, or in its normal position, the lever 20, on the stub-shaft 17, is disposed horizontally, as shown in Figures 1 and 3. With the lever in this position, the cam 18 on the shaft 17 is contacting the roller 19 on the end of the plate 16, thereby forcing the frame 8, together with the lower jaw 9, downwardly against the action of the spring 15 and the cam 21 is in such a position as to permit the upper jaw 10 to be forced upwardly away therefrom due to the action of the coil springs 37, providing sufficient clearance to place the work between the jaws.

In operation, the work or pipe to be threaded is suitably positioned between the jaws 9 and 10 and the lever 20 moved to a vertical position, as shown in the broken lines of Figure 2. Upon movement of the lever 20, cam 18 is moved out of contact with the roller 19, thereby permitting the frame 8, together with the lower jaw 9 carried thereby, to move upwardly due to the action of the loaded coil spring 15. At the same time, the cam 21, also carried by the shaft 17, and bearing on the head of the screw 22, forces the upper jaw 10 downwardly against the action of the coil springs 37 positioned between the jaws, thereby locking the pipe or work therebetween.

It will be seen that the pipe is now firmly gripped in the chuck but the frame 8 is still floating and permitted to move within certain limits in any direction at right angles to the center line thereof.

The carriage, together with the pipe, is then moved toward the rotating head 5 so as to properly position the end of the pipe to be threaded in the threading dies carried thereby. The carriage is advanced by moving the actuating lever 33 downwardly which, in turn, rotates the annular shaft 32 together with the crank arm 34 carried thereby which in turn moves the member 35 so as to position the half-nuts 7 in contact with the lead screw 6. It will, of course, be understood that the lead screws 6 can be driven in any suitable manner. After the end of the pipe is engaged by the threading dies of the rotating head 5 and centered relative thereto, the floating frame 8 is securely locked against movement by moving the actuating lever 31 downwardly which rotates the shaft 29, together with the crank arms 28 carried thereby, and through the action of the links 27 and crank arms 26 carried by the clamping screws 23, moves the plates 25 against the frame 8 securely clamping the same to the carriage. It will be seen that the pipe has centered itself relative to the threading die or cutting tools and the threading or cutting operation can now be easily and accurately performed thereon. Upon completion of the threading operation, the above operations, of course, are reversed, and the threaded pipe is taken therefrom and the successive pipes to be threaded are positioned therein and threaded, as above described.

While we have shown and described one embodiment of our invention, it will be understood that this embodiment is merely for the purpose of illustration and description and that various other forms may be devised within the scope of our invention, as defined in the appended claims.

We claim:

1. A self-centering chuck comprising, in combination, a rigid support, a frame floatingly mounted on said support for movement in both a horizontal and vertical plane, work-engaging means carried by said frame, said work-engaging means consisting of at least two parts, one part of which is securely positioned in said frame and the other part being movably mounted therein, means for moving simultaneously said frame and the movable work-engaging parts carried thereby so that said work-engaging means in one position is adapted to firmly grip the work positioned between said parts and in another position to be disengaged therefrom, and means carried by said support which is adapted to cooperate with said frame for locking the same against movement in said support.

2. A self-centering chuck comprising, in combination, a rigid support, a frame floatingly mounted on said support for movement in both a horizontal and vertical plane, work-engaging means carried by said frame, said work-engaging means consisting of one part which is securely mounted in said frame so as to engage one side of the work and another part movably mounted therein for engaging the opposite side of the work, means for simultaneously moving the frame together with the work-engaging part securely carried thereby and the work-engaging part movably carried thereby toward each other so that the work-engaging parts cooperate to securely hold the work therebetween, and means carried by said support which is adapted to cooperate with said frame for locking the same and work-engaging parts carried thereby against movement in said support.

3. A self-centering chuck comprising, in combination, a rigid support, a frame carried by said support for movement in both a horizontal and vertical plane, resilient means for mounting said frame floatingly thereon, work-engaging means carried by said frame, said work-engaging means consisting of one part which is securely mounted in said frame so as to engage one side of the work and another part movably mounted therein for engaging the opposite side of the work, resilient means for normally keeping said parts spaced apart and away from the position they would assume when engaging the work, means for simultaneously moving said frame together with the work-engaging part carried thereby and said movable work-engaging part toward each other against the action of said last mentioned resilient means so as to firmly grip the workpiece, and means carried by said support which is adapted to cooperate with said frame for securely locking the same against movement relative thereto.

4. A self-centering chuck comprising, in combination, a rigid support, a frame carried by said support, resilient means for mounting said frame floatingly thereon, a pair of oppositely disposed jaws arranged one above the other in said frame with the bottom jaw being securely attached thereto and the top jaw movably mounted therein, means for forcing said frame together with the bottom jaw carried thereby downwardly against the action of said resilient means loading the same, resilient means for normally keeping said jaws spaced apart, means for forcing simultaneously said top jaw in said frame downwardly against the action of said last mentioned resilient means to position the top jaw in engagement with the top of the workpiece and permitting the frame together with the bottom jaw carried thereby to move upwardly due to the action of said first mentioned resilient means so as to position the bottom jaw in engagement with the bottom of the workpiece whereby the jaws together firmly grip the same, and means carried by said support which is adapted to cooperate with said frame for securely locking the same against movement relative thereto.

5. A self-centering chuck comprising, in combination, a rigid frame-like support, a movable frame arranged on said support, said frame being loosely suspended from a coil spring centrally arranged on the top of said frame-like support, a pair of oppositely disposed jaws arranged one above the other on said frame with the bottom jaw being securely attached thereto and the top jaw movably mounted thereon, means carried by said support for forcing said frame together with the bottom jaw carried thereby downwardly against the action of said coil spring loading the same, a pair of coil springs arranged between the jaws for normally keeping them spaced apart, means for forcing simultaneously the top jaw in said frame downwardly against the action of said pair of coil springs to position the top jaw in engagement with the top of the workpiece and permitting the frame together with the bottom jaw carried thereby to move upwardly so as to position the bottom jaw in engagement with the bottom of said workpiece whereby the jaws together firmly grip the same, and means carried by said support which is adapted to cooperate with said frame to securely lock the same against movement relative thereto.

6. A self-centering chuck comprising, in combination, a rigid frame-like support, a frame loosely suspended on said support by a stud bolt arranged centrally in the top thereof and extending upwardly therefrom through the top of said support, a coil spring associated with said stud and arranged above said support for resiliently and loosely supporting said frame therein, a roller mounted on said support directly below said coil spring to one side of the support, a stud shaft arranged in said frame directly below said roller, a cam arranged on said shaft which is adapted to cooperate with said roller to force the frame downwardly loading said coil spring, a pair of oppositely disposed jaws arranged one above the other in said frame with the bottom jaw being securely attached thereto and the top jaw movably mounted therein, an adjustable screw arranged centrally of said jaw in the top thereof directly below the said stud shaft, another cam arranged on said shaft directly above said adjustable screw with which it is adapted to cooperate, a handle arranged on said shaft, a pair of coil springs arranged between said jaws for normally keeping them spaced apart and for forcing the adjustable screw against the cam thereabove, said first mentioned cam on said shaft adapted to permit the frame together with the bottom jaw securely arranged therein to move upwardly due to the action of said spring so as to position said bottom jaw in engagement with the bottom of the workpiece and said second mentioned cam therein adapted to act against the adjustable screw in said top jaw so as to force the top jaw downwardly against the top of the workpiece whereby the jaws firmly grip the workpiece when the shaft is turned by means of the handle carried thereby, and releasable means carried by said support and cooperating with said frame for securely locking the same against movement relative thereto.

7. A self-centering chuck comprising, in combination, a member mounted for floating movement in both a horizontal and vertical plane, work-engaging means carried by said member, said work-engaging means consisting of one part which is securely mounted on said member so as to engage one side of the workpiece and another part movably mounted thereon for engaging the opposite side of the workpiece, means for moving simultaneously said floating member together with the work-engaging part securely mounted thereon and the work-engaging part movably carried thereby so that the work-engaging parts move toward each other whereby they cooperate with each other to securely hold the workpiece therebetween, and means for locking said floating member together with the work-engaging means carried thereby against movement.

8. A self-centering chuck comprising, in combination, a rigid support, a single floating frame mounted on said support for movement in both a horizontal and vertical plane, resilient means for mounting said frame floatingly on said support, a pair of oppositely disposed jaws arranged one above the other in said frame with one of said jaws being securely mounted therein and the other of said jaws being movably arranged therein, resilient means for normally keeping said jaws spaced apart, means for forcing said frame together with the jaw securely carried thereby against the action of said resilient means thereby loading the same, means for forcing simultaneously the movably arranged jaw in said frame toward the center thereof against the action of said last mentioned resilient means to position the same in engagement with the workpiece and permitting the frame together with the jaw securely carried thereby to move in the opposite direction due to the action of said first mentioned resilient means so as to position that jaw in engagement with the workpiece on the opposite side thereof whereby the jaws together firmly grip the same, and means carried by said support which is adapted to cooperate with said frame for securely locking the same against movement relative thereto.

9. A self-centering chuck comprising, in combination, a rigid support, a frame floatingly carried by said support, resilient means arranged at the top of said support from which said frame is floatingly suspended centrally thereof so as to permit movement of said frame in both a horizontal and vertical plane, a pair of oppositely disposed jaws arranged one above the other in said frame with the bottom jaw being securely attached thereto and the top jaw movably mounted therein, means for forcing said frame together with the bottom jaw carried thereby downwardly against the action of said resilient means loading the same, resilient means for normally keeping said jaws spaced apart, means for forcing simultaneously said top jaw in said frame downwardly against the action of said last mentioned resilient means to position the top jaw in engagement with the top of the workpiece and permitting the frame together with the bottom jaw carried thereby to move upwardly due to the action of said first mentioned resilient means so as to position the bottom jaw in engagement with the bottom of the workpiece whereby the jaws together firmly grip the same, and means carried by said support which is adapted to cooperate with said frame for securely locking the same against movement relative thereto.

LOREN A. HAYES.
WALTER T. MAHLA.